July 25, 1950     E. B. FERRELL     2,516,765
TRACKING CONTROL
Filed Feb. 24, 1944     9 Sheets-Sheet 6
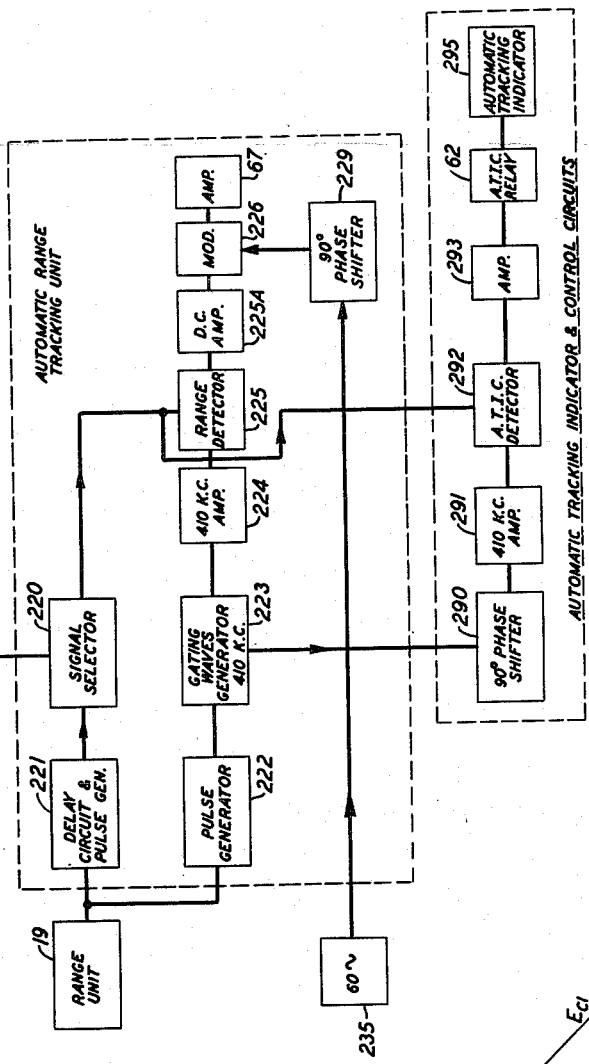
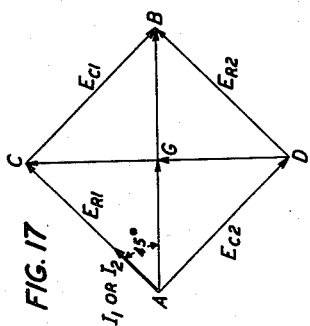
INVENTOR
E. B. FERRELL
BY
ATTORNEY

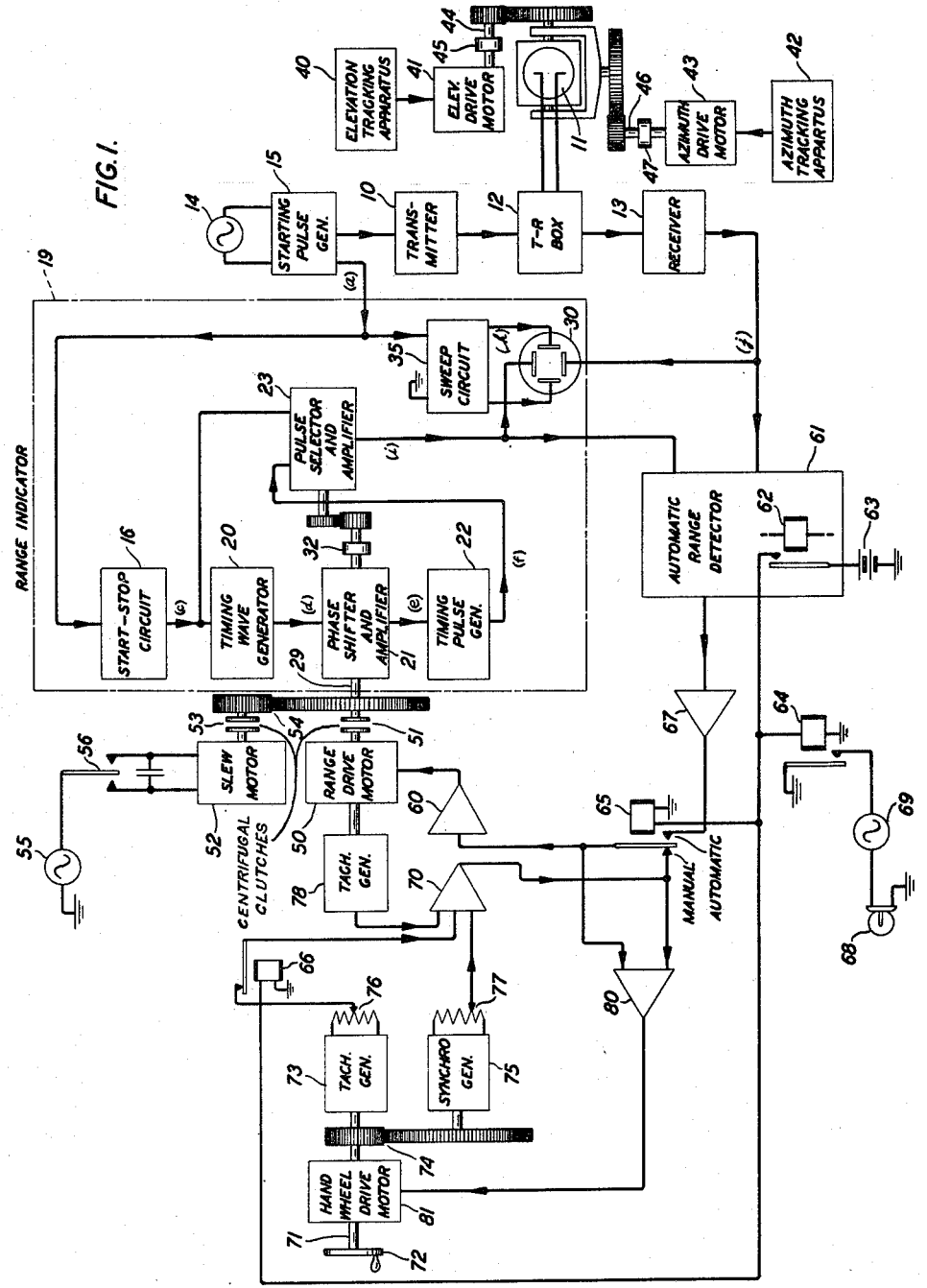

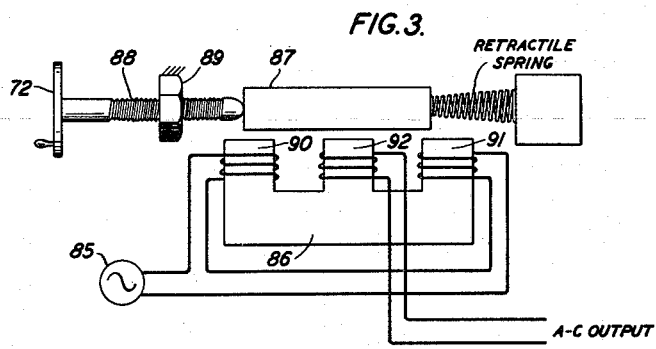
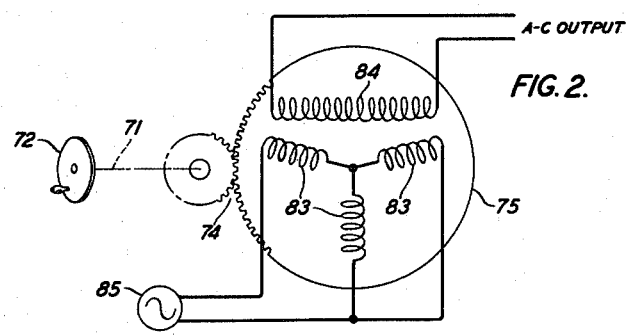
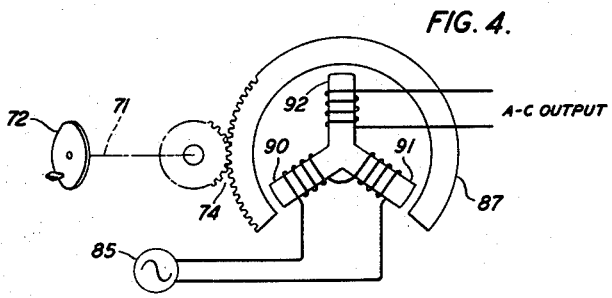

Patented July 25, 1950

2,516,765

UNITED STATES PATENT OFFICE 2,516,765

TRACKING CONTROL

Enoch B. Ferrell, Chatham, N. J., assignor to Bell Telephone Laboratories, Incorporated, New York, N. Y., a corporation of New York Application February 24, 1944, Serial No. 523,717

4 Claims. (Cl. 318—440)

This invention relates to tracking apparatus and more particularly to apparatus for continuously locating or indicating the position of a distant object or target which may be moving at a varying rate.

An object of the invention is to provide improved electrical apparatus for controlling the angular velocity and phase of a controlled or output shaft in response to the angular displacement of an input or controlling shaft.

Another object of the invention is to provide apparatus for tracking an object automatically under control of signaling energy supplied thereto and a manually controllable apparatus for tracking the object which is automatically made effective for tracking control upon failure of the automatic tracking apparatus to perform the tracking function.

Another object is to provide apparatus for tracking an object automatically under control of signaling energy supplied thereto, a manually controllable apparatus for tracking the object, and means for causing the automatic tracking apparatus to control the manually controllable apparatus during periods when the automatic apparatus is performing the tracking function to condition the manually controllable apparatus for performing the tracking function upon cessation of the automatic apparatus to perform the tracking function.

An object or target may be located by giving the distance of the target from a reference point or origin, the angle of elevation from a horizontal reference plane subtended at the origin, and the angle of azimuth from a vertical reference plane. In a system for determining these coordinates to which this invention relates, pulses of radio frequency energy are radiated from a directional antenna and the pulses which reach the target are reflected therefrom and picked up by the antenna. While it is somewhat preferable to employ a single directional antenna, separate transmitting and receiving antennae mechanically coupled may be employed if desired. To direct the radiated pulses to the target so that echo pulses from the target will reach the antenna, there are provided a motor for driving the antenna about a horizontal axis to change the direction of the radiated beam in elevation and a second motor for driving the antenna about a vertical axis to change the direction of the beam in azimuth. The angular displacement of the first motor shaft from a reference position is therefore a measure of the elevation of the target, and the angular displacement of the second motor shaft from a reference position is a measure of the azimuth of the target. The range of the target is proportional to the delay interval separating the echo pulses from the corresponding transmitted pulses and a suitable range indicator is provided for measuring the delay period and thereby indicating the range.

The present invention is applicable to a system for tracking or following a target with respect to each of a plurality of coordinates simultaneously to continuously determine the target position. However, since similar apparatus may be used for tracking the target in each coordinate, the invention will be described herein as specifically applied to tracking the target to continuously indicate its range.

In a specific embodiment of the invention herein shown and described for the purpose of illustration, there is provided automatic range tracking apparatus for detecting errors of the range indication produced by a range indicator and for setting up an electric signal for controlling the energization of a driving motor coupled to the shaft of the range indicator to cause the shaft to be displaced in such a direction and by such an amount that the range indication error is corrected automatically. Because of the high frequency of recurrence of the pulses which control the automatic tracking apparatus, the range indicator serves to continuously indicate the range of the target, which range may be changing at varying rates.

For initially locating a certain target and for tracking the target during intervals when the automatic tracking apparatus fails to function due to fading of the echo pulses, for example, there is provided a manually controllable tracking apparatus for energizing the driving motor for the shaft of the range indicator. In this apparatus there is provided means for generating and impressing upon the range indicator drive motor a voltage having a component proportional to the angular displacement of a hand-wheel shaft under control of an operator and a component proportional to the rate of change of hand-wheel shaft displacement with the result that the motor driven shaft displacement has a component proportional to the time integral of the hand-wheel shaft displacement and a component proportional to the hand-wheel shaft displacement. The angular velocity and phase of the motor driven shaft may thus be readily manually adjusted to cause the range indicating apparatus to track the target, that is, to continuously indicate its range. There is also provided means under the control of the operator for changing the ratio of the two voltage components applied to the tracking motor which drives the shaft of the range indicator to facilitate target tracking by manual control under various operating conditions. For example, it may be desirable to use a different ratio of voltage components in tracking a target which is accelerating or decelerating rapidly in a particular coordinate than that used in tracking a target the speed of which in that coordinate is changing relatively slowly.

Whenever the automatic range tracking apparatus ceases to function, due to fading of the echo pulses, for example, means are provided for interrupting a first circuit for supplying energy from the automatic range tracking apparatus to the range indicator drive motor and completing a second circuit for supplying energy from the manually controllable apparatus to the range tracking motor. When the automatic apparatus is subsequently capable of performing the tracking function, the second circuit is interrupted and the first circuit completed under automatic control.

There is provided a motor coupled to the hand-wheel shaft upon which is impressed, during automatic tracking periods, a voltage proportional to the difference between the voltage being supplied to a circuit for energizing the range indicator drive motor from the automatic range tracking unit and the voltage which would be supplied to that circuit from the manually controllable tracking apparatus if the system were conditioned for tracking by the manually controllable apparatus. The voltage output from the manually controllable apparatus is thus maintained equal to the voltage output from the automatic tracking apparatus so that the speed of the tracking motor will be the same immediately after switching to the manually controllable apparatus as it was just prior to the time of switching. Therefore, if the rate of change of range of a target remains constant during a fading interval of the echo pulses, the automatic tracking apparatus will resume control after the fading interval without the necessity of manual adjustment of the hand-wheel. However, if the rate of change of range varies by a substantial amount during the fading period, manual adjustment of the hand-wheel to correct the range indication is required before the automatic apparatus will resume control.

In the accompanying drawing,

Fig. 1 is a diagrammatic view of a tracking system in accordance with the present invention;

Figs. 2 and 4, inclusive, are diagrammatic views of apparatus which may be used in various embodiments of the invention for producing an alternating voltage which varies in amplitude in accordance with displacement of a controlling shaft and in phase in accordance with the direction of the shaft displacement;

Figs. 5 to 10, inclusive, are diagrammatic views of modified arrangements for controlling the displacement of a shaft driven by an electric motor in accordance with the invention;

Fig. 13 is a schematic block diagram of an automatic range detector used in Fig. 1;

Figs. 16 and 17 are diagrams used in describing the operation of the automatic range detector of Figs. 13, 14 and 15.

Figure 5:
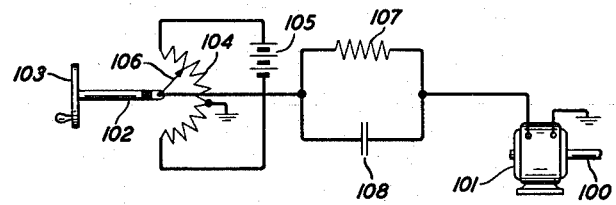

Referring now to the drawing, there is shown in Fig. 1 a system for tracking or continuously following an object or target to determine its location with respect to azimuth, elevation and range. There are provided an oscillator 14 for generating a sinusoidal wave which is impressed upon a starting pulse generator 15 which generates a series of pulses of brief duration, one for each cycle of the sinusoidal wave. The starting pulses are impressed upon a radio transmitter 10 which produces a series of brief pulses of radio frequency energy. These radio pulses are impressed through a suitable coupling arrangement or T-R box 12 upon a dipole directional antenna 11 from which the pulses are radiated toward a target. Echo pulses reflected from the target are picked up by the antenna 11 and impressed through the T-R box upon radio receiving apparatus 13. The coupling arrangement 12 serves to shunt the input of the receiver 13 during pulse transmitting periods so that the same antenna may be used both for transmission and reception of pulses. The T-R box is a transmit-receive switch which may be of any desired type and may conveniently be a Western Electric Company 709A vacuum tube. This vacuum tube is essentially a resonant cavity filled with an ionizable gas. During reception, with the low voltages of the received energy, the gas is not ionized, the cavity is tuned to resonance and the received energy is conducted to the radio receiver 13. During the transmission of a pulse, the voltages due to the pulse ionize the gas, thus detuning the cavity and preventing the energy of the pulse from reaching the radio receiver 13. Means, not shown, are provided for continuously rotating the dipole of the directional antenna to provide for conical scanning so that the difference between the direction of pointing of the antenna and the actual direction of the target may be detected and a signal generated for driving the antenna into a substantially correct pointing position.

Apparatus 40 is provided for detecting the error in pointing of the antenna 11 with respect to elevation and for producing a signal for energizing a motor 41 for driving the antenna structure about a horizontal axis to change the direction of radiation of the antenna with respect to elevation. Similar apparatus 42 is provided for detecting the error in pointing of the antenna 11 with respect to azimuth and for producing a signal for energizing a motor 43 for driving the antenna structure about a vertical axis to change the direction of radiation with respect to azimuth. The antenna 11 is thus driven into such a position with respect to elevation and azimuth that the radiated pulses reach a desired target, are reflected therefrom, and the reflected echo pulses picked up by antenna 11. The displacement of the driving shaft 44 of elevation drive motor 41 from a reference position, as may be indicated by a suitable indicating device 45 coupled to the shaft, is therefore a measure of the elevation of the target and similarly the displacement of the drive shaft 46 of azimuth drive motor 42 from a reference position, as may be indicated by a suitable indicating device 47 coupled to the shaft, is therefore a measure of the azimuth of the target.

In addition to the apparatus for tracking a target with respect to elevation and azimuth there is provided a range tracking apparatus for producing an indication of the range of the target corresponding to the angular displacement of a shaft 29 coupled to a two-phase induction motor 50 through a centrifugal clutch 51. For causing the shaft 29 to rotate rapidly in one direction or the other for use in searching for a target, for example, a slew motor 52 is coupled to shaft 29 through clutch 53 and gears 54, the motor 52 being energized from a source of alternating current 55 when an energizing circuit is completed through one of the contacts of a switch 56. When motor 52 is energized, clutch 53 becomes engaged and clutch 51 disengages. Since the means embodying the invention for controlling the energization of the elevation and azimuth tracking motors 41 and 43, respectively, is generally like the means for controlling the energization of the range tracking motor 50, it will suffice to describe only the range tracking apparatus more in detail.

There is provided a range indicating apparatus 19 which may be like that disclosed in United States Patent No. 2,422,205, granted to L. A. Meacham June 17, 1947. As disclosed in said patent, the range indicating apparatus comprises a start-stop circuit 16 which produces a square wave (c) in response to each pulse (a) supplied to the circuit from starting pulse generator 15. The voltage wave (c) produced by the start-stop circuit 16 is impressed upon a timing wave generator 20 which generates a succession of trains of constant frequency oscillatory waves (d) the phase of which may be shifted continuously through a plurality of cycles in response to rotation of shaft 29 of phase shifter 21. The period of this oscillatory wave, or a phase shift of the wave through a single cycle, corresponds to the time interval required for a radiated pulse to travel through a certain distance and for its echo to return through that distance. The distance represented by a single cycle of the oscillatory wave is the velocity of propagation of the radiated pulse divided by twice the frequency of the oscillatory wave. The timing wave (e) from the output amplifier of the phase shifter 21 is impressed upon a timing pulse generator 22 which produces alternate, positive and negative timing pulses (f), a pulse being produced at the beginning of each half cycle of the timing wave. The square wave (c) from the start-stop circuit and the timing pulses (f) from the timing pulse generator are impressed upon a pulse selector 23 which selects a pulse (i) of each group of timing pulses (f) which selected pulses are delayed by a desired interval with respect to the corresponding starting pulses (a). Echo pulses (j) from the output of the radio receiver 13 are impressed upon one of the vertical deflecting plates of cathode ray tube 30 and the range pulses (i) are impressed upon the other vertical deflecting plate. A linear sweep wave (h) is applied from a suitable sweep wave generator 35 to the horizontal deflecting plates of cathode ray tube 30, starting pulses (a) from starting pulse generator 15 being supplied to the sweep wave generator for maintaining the sweep wave in synchronism with the starting pulses. The rotation of shaft 29 causes a range mark produced upon the luminescent screen of the cathode ray tube due to the range pulses (i) to travel across the screen. When the range mark on the cathode ray tube screen due to the range pulses (i) is in alignment with the mark produced upon the screen due to the echo pulses (j), the range of the target may be read directly from a revolution counter or indicator 32 attached to the shaft 29, the indicator being calibrated in units of distance.

The motor 50 for driving the shaft 29 is a two-phase induction motor having a cylindrical armature which rotates at a speed proportional to the amplitude of the alternating voltage impressed upon one of its phase windings from the output of an amplifier 60 and which rotates in a direction corresponding to the phase of that voltage with respect to that of the fixed phase voltage (not shown) impressed upon its other phase winding. There is provided an automatic range detector 61 upon which the range pulses (i) from the output of the range indicator 19 and echo pulses (j) from the radio receiver 13 are impressed. When the range pulses (i) are not coincident with corresponding echo pulses (j) but are sufficiently close to coincidence to cause the range detecting apparatus 61 to function, this apparatus produces a current for energizing a relay 62 the operation of which completes circuits for supplying energizing current from grounded battery 63 to the windings of relays 64, 65 and 66. The operation of relay 65 completes a circuit from the automatic range detector 61 through amplifier 67, right-hand contact of relay 65, and amplifier 60 to motor 50 to impress upon the motor a voltage of such phase that the shaft 29 is driven in a direction to cause the pulses (i) to be brought into coincidence with corresponding echo pulses (j), at which time the range indicator correctly indicates the range of the target from which the echo pulses are being received. If the target is moving so that its range is changing, there is applied to the motor 50 from the automatic range detector 61 a voltage proportional to the speed at which the range is changing so that the target is automatically followed or tracked with respect to range and so that the range indicator will continuously indicate the range. The energization of relay 64 completes a circuit for energizing a lamp 68 from an alternating current source 69 to indicate to an operator that the automatic range tracking apparatus is functioning.

When the automatic tracking apparatus 61 ceases to function for some reason, for example, due to the fading of the received echo pulses, relays 62, 64, 65 and 66 become deenergized and, as a result, the indicator lamp 68 is extinguished and a circuit is completed from the output of a summing amplifier 70 to the input of amplifier 60 for supplying energy to motor 50. The summing amplifier is an amplifier upon the input of which the vector sum of a plurality of component voltages is impressed. If desired, the summing amplifier may be of the type disclosed in U. S. 2,401,779 to K. D. Swartzel, Jr., granted June 11, 1946. Under this condition the energization of motor 50 is controlled in accordance with the angular displacement of a shaft 71 which may be manually controlled by turning a hand-wheel 72 secured to the shaft. The shaft 71 drives an induction generator 73, the construction of which may be similar to that of motor 50, to produce an output voltage proportional to the rate of change of displacement of the shaft 71. Since the voltage produced by generator 73 is proportional to the speed of shaft 71, it is sometimes identified as a tachometer generator. There is also coupled to the shaft 71 through gearing 74 a generator 75, such as a synchrogenerator, which produces an alternating output voltage the phase of which is reversed in response to a reversal of the direction of rotation of shaft 71 from a reference position and the amplitude of which is proportional to the displacement of shaft 71 from the reference position at which the output voltage is zero.

Means such as potentiometers 76 and 77 are provided for changing by manual control the output voltage from generators 73 and 75, respectively, so that the ratio of the two voltages may be controlled as desired. The output voltage from generator 75 and the output voltage from generator 73 are impressed upon the input of summing amplifier 70, this amplifier producing an output voltage proportional to the vector sum of the component voltages impressed upon its input circuit. The circuit from generator 73 to amplifier 70 is completed through a contact of relay 66. A third voltage is impressed upon the input of amplifier 70 from a tachometer generator 78, like the generator 73, which produces a voltage proportional to the speed of shaft 29 when the motor 50 is coupled to shaft 29. This third voltage impressed upon summing amplifier 70 is opposite in phase to, and has an amplitude less than, the voltage from generator 75 and is provided for correcting for inaccuracies in displacement of shaft 29 in response to the voltage impressed upon motor 50. It is desired that the rate of change of displacement of shaft 29 be at all times proportional to the voltage impressed upon the motor 50. When this response is too small, for example, the output of generator 78 is relatively small and the energization of motor 50 is increased to correct for the inaccuracy in response.

During periods when the automatic range detector 61 is functioning to supply energy to motor 50, a circuit is completed from the apparatus 61 through amplifier 67 and right-hand contact of relay 65 to one input terminal of a differential amplifier 80 and the output of amplifier 70 is connected to another input terminal of differential amplifier 80. The output voltage of differential amplifier 80, which is proportional to the difference of the voltages from amplifiers 67 and 70, is impressed upon a motor 81 coupled to the hand-wheel shaft 71. Under this operating condition the circuit for supplying voltage from generator 73 to summing amplifier 70 is interrupted at the contact of relay 66. Whenever the voltage from the output of amplifier 67 differs from the voltage at the output of amplifier 70, the motor 81 is energized to cause the rotation of shaft 71 in one direction or the other until the two voltages are equal. Therefore, if it be assumed that the range of a target is changing at a constant rate, a constant amplitude alternating voltage will be impressed upon motor 50 from the automatic range detector 61 and, when fading of the echo pulses occurs with the result that relays 62, 64, 65 and 66 become deenergized, constant voltage of the same amplitude and phase will be supplied to motor 50 from generator 75, no manual adjustment of the hand-wheel 72 being required. When fading of the echo pulses subsequently ceases relays 62, 64, 65 and 66 become energized and the constant voltage is again supplied to motor 50 from the automatic range detector 61.

For initially bringing the range pulses (i) nearly into coincidence with the echo pulses (j) or for doing so during a fading period when there is a change in the rate at which the target range is increasing or decreasing, it becomes necessary to make an adjustment of the manually controllable apparatus by rotating the hand-wheel 72. Rotation of the hand-wheel causes motor 50 to be energized so as to rotate shaft 29 in a direction corresponding to the direction of rotation of the hand-wheel shaft 71. The driven shaft 29 is thus given two components of displacement, one proportional to the displacement of the hand-wheel shaft, and the other proportional to the time integral of the displacement of the hand-wheel shaft. The ratio of the two components of the displacement of shaft 29 may be varied by manually adjusting the potentiometers 76 and 77, the preferred adjustment for a given operating condition being best determined by trial. For example, it may be desirable to have the ratio of the output from tachometer generator 73 to that from synchrogenerator 75 relatively larger when the rate of change of range of the target varies rapidly than is the case when the rate of change of range varies slowly.

Fig. 2 shows the synchrogenerator or transformer 75 of Fig. 1 more in detail. Current from an alternating current source 85 is supplied to the stator windings 83 of the generator 75 with the result that there is induced in rotor winding 84 an alternating voltage having the frequency of the source 85. The position of the rotor is changed in accordance with the angular displacement of shaft 71. At a certain reference position of shaft 71 no voltage is induced in winding 84. Displacement of shaft 71 in one direction from the reference position causes a voltage of one phase to be induced in winding 84 and a shaft displacement in the opposite direction from the reference position causes a voltage of opposite phase to be induced in winding 84. The amplitude of the voltage induced in winding 84 is proportional to the displacement of shaft 71 from the reference position.

In the arrangement shown in Fig. 3, there is employed a magnetic core member 86 having three legs and a movable magnetic member 87 which may be moved by turning the screw 88 in engagament with nut 89. As the screw is turned to move the member 87, the reluctance of the magnetic path including the center leg and one of the outer legs is increased while the reluctance of the path including the middle leg and the other outer leg is simultaneously decreased. Windings 90 and 91 on the outer legs respectively set up aiding magnetomotive forces in the core so that zero flux flows through the middle leg and zero voltage is induced in the output winding 92 on the middle leg when member 87 is in a certain reference position such that the reluctances of the two magnetic paths each including the middle leg are equal. When the member 87 is moved in one direction from the reference position, voltage of one phase is induced in winding 92, and when member 87 is moved in the opposite direction from the reference position the phase of the induced output voltage is reversed. The amplitude of the induced voltage is determined by the ratio of the reluctances of the two paths and therefore by the displacement of member 87 and of screw 88 from a reference position.

The arrangement of Fig. 4 is similar to that of Fig. 3 and the corresponding parts bear the same designation. In this arrangement there is employed a Y-shaped stator member on which the windings 90, 91 and 92 are wound. The movable member or rotor 87 is in the form of an open ring which can be rotated about its center by means of the hand-wheel 72. In this embodiment the leg of the Y on which winding 92 is wound is common to the two magnetic paths including the other legs of the Y, respectively, the reluctance of one of which is increased while that of the other is simultaneously decreased due to the rotation of hand-wheel 72.

In Fig. 5 is shown a modified arrangement for controlling the angular displacement of a shaft 100 driven by a reversible motor 101 under control of an input shaft 102 which may be manually rotated by a hand-wheel 103. There is provided a potentiometer 104 the end terminals of which are connected to the terminals of a battery 105 and a mid-terminal of which is grounded. A brush 106 in sliding contact with the winding of potentiometer 104 is driven from the shaft 102. The brush 106 is connected to one terminal of a circuit including a resistor 107 and a condenser 108 in shunt with respect to each other, and the other terminal of this circuit is connected to one terminal of motor 101, the other motor terminal being grounded. It is seen that one component of the energizing current supplied to motor 101 flows through resistor 107 while the other component flows through condenser 108. The direction of the current flow through resistor 107 depends upon the direction of the displacement of brush 106 from the grounded mid-terminal of the potentiometer winding and therefore upon the direction of the displacement of the shaft 102 from a reference position. The amplitude of the current through resistor 107 is proportional to the angular displacement of shaft 102 from the reference position. The amplitude of the current flowing through condenser 108 is proportional to the rate of change of displacement of shaft 102. The speed of motor shaft 100 is assumed to be proportional to the voltage impressed upon the motor. Therefore if H is the displacement of the controlling shaft 102 and $\theta$ is the displacement of the driven shaft 100 and E is the voltage impressed upon the motor 101, $$p\theta = BH + ApH$$

$$\theta = B\frac{H}{p} + AH$$

and $$E = B'H + A'pH$$

where A, B, A' and B' are constants and $p$ is the differential operator.

Figure 6:
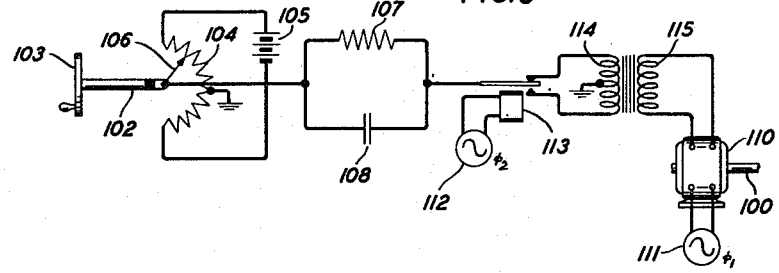

In Fig. 6 there is shown a modification of the arrangement depicted in Fig. 5, the similar parts having the same designation in each figure. In this embodiment there is used a two-phase induction motor 110 for driving the shaft 100. One phase 111 of a two-phase voltage source is impressed upon one winding of motor 110 while the second phase 112, in quadrature with respect to the first, is impressed upon the winding of a polarized relay 113. A terminal of the network comprising resistor 107 and condenser 108 is connected through the armature and contacts of relay 113 to the end terminals alternately of the primary winding 114 of a transformer, the secondary winding 115 of which is connected to the second winding of motor 110. A mid-terminal of the winding 114 is connected to ground. In this embodiment of the invention, the direct current output from the potentiometer 104 and resistance-capacity network 107, 108 is converted into alternating current by means of a relay modulator. The use of the push-pull connection eliminates all even harmonics of the fundamental frequency and, if the relay timing is so adjusted that each contact closure lasts for one-third cycle, and each open period of the contacts lasts for one-sixth cycle, the output signal contains no harmonics which are multiples of three. The lowest harmonic present in the output signal is therefore the fifth and a shunt condenser to reduce this harmonic can readily be tolerated.

Figure 7:
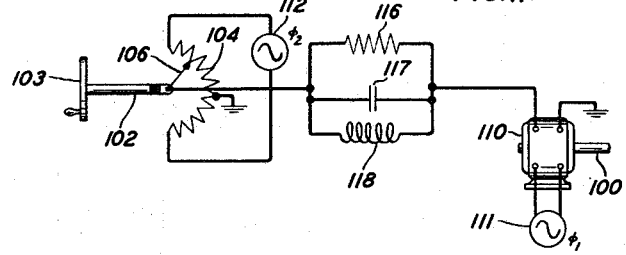

The embodiment of the invention shown in Fig. 7 differs from that shown in Fig. 5 in that one phase 111 of a two-phase source is applied to an induction motor 110, while the second phase 112 is applied across the potentiometer 104. In place of the resistance-capacity network 107, 108 of Fig. 5 there is used a network comprising resistor 116, condenser 117, and inductance element 118, all connected in parallel. The portion of the network consisting of condenser 117 and inductance element 118 is anti-resonant at the power supply frequency just as condenser 108 of Fig. 5 has infinite impedance to direct current.

Figure 8:
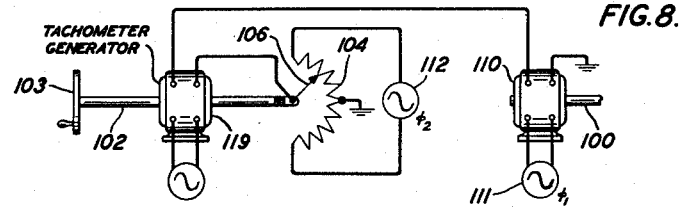

In the embodiment of the invention illustrated in Fig. 8, there is coupled to the hand-wheel shaft 102, in addition to the brush arm for moving brush 106 of potentiometer 104, a tachometer generator 119 which generates a voltage proportional to the speed of shaft 102. The voltage from potentiometer 104 proportional to displacement of shaft 102, and the voltage from generator 119 are connected in series to a winding of motor 110. One phase of a two-phase power source is applied to the other phase winding of motor 110 while the second phase of the power source is applied across potentiometer 104. The motor 110 and generator 119 may be of similar or, for low output power, identical construction. Particularly suitable is the so-called drag cup unit which makes use of a two-phase winding on the stator and a thin shell of aluminum or other suitable conducting material for the armature. One of the stator windings is excited continuously at full rating. If a control voltage is applied to the second stator winding which is in quadrature to that applied to the first winding, a torque substantially proportional to the control voltage is produced. If instead of applying a quadrature control voltage to the second stator winding the rotor is driven mechanically, a voltage proportional to rotor speed is generated in the second stator winding.

Figure 9:
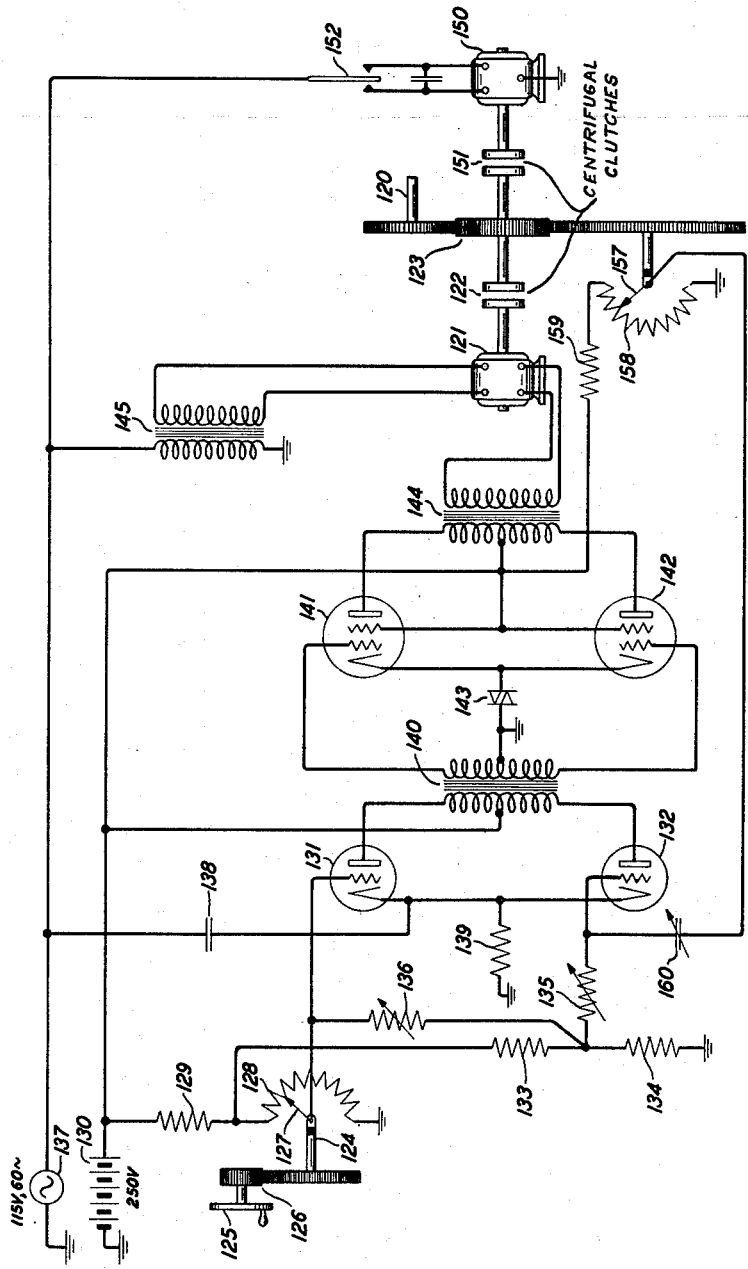

In Fig. 9 the displacement of an output shaft 120, driven by a motor 121 through centrifugal clutch 122 and gears 123, is under control of a controlling shaft 124 which may be angularly displaced by rotation of a hand-wheel 125 coupled to shaft 124 through gearing 126. The shaft 120 may also be driven at a rapid rate independently of control from shaft 124 by means of a motor 150 through centrifugal clutch 151 when an energizing circuit for motor 150 is completed from source 137 through a manually operated key 152. The shaft 120 may be coupled to a range indicator, for example. The shaft 124 drives a brush 127 in sliding contact with the winding of a potentiometer 128 one terminal of which is grounded and the other terminal of which is connected through a resistor 129 to the positive terminal of battery 130 having its negative terminal connected to ground. There is provided a modulator comprising electronic devices 131 and 132 each having an anode, a cathode and a control electrode. The potentiometer brush 127 is connected to the control electrode of tube 131. Current from source 130 is also supplied through resistor 129 to the voltage dividing resistors 133 and 134, one terminal of resistor 134 being grounded and the common terminal of resistors 133 and 134 being connected through variable resistor 135 to the control electrode of tube 132. A variable resistor 136 has one terminal connected to the brush 127 and its other terminal connected to the common terminal of resistors 133, 134 and 135. Alternating current is supplied from source 137 to a circuit comprising a phase shifting condenser 138 and a resistor 139, a terminal of resistor 139 and a terminal of source 131 being grounded. It will be seen that there is included in the control electrode-cathode circuit of each of tubes 131 and 132 an alternating voltage and a direct voltage. The alternating voltage impressed upon each of these circuits is that appearing across resistor 139 due to current from source 137 flowing therein. The direct voltage component in the control electrode-cathode circuit of tube 131 is the voltage drop across that portion of potentiometer 128 between the brush 127 and ground. The direct voltage in the control electrode-cathode circuit of tube 132 is the voltage drop across resistor 134 to which is added the voltage drop across resistor 135 when current flows through that resistor. For supplying anode current to tubes 131 and 132 the positive terminal of battery 130 is connected to a mid-terminal of primary winding of transformer 140, the end terminals of this primary winding being connected to the anodes of tubes 131 and 132, respectively. When the voltage drop measured between the brush 127 of potentiometer 128 and ground is equal to the voltage drop across resistor 134, at which time it may be said that the shaft 124 is in a reference position, the resultant voltages applied to the control electrode-cathode circuits of tubes 131 and 132, respectively, are equal, so that the anode currents of tubes 131 and 132 flowing through the two halves of the primary winding of transformer 140 are equal and the voltage across the secondary winding of transformer 140 is zero.

Assuming for the present that no current is flowing through resistor 135, when the shaft 124 is angularly displaced, the direct voltage component impressed upon the control electrode-cathode circuit of tube 131 is increased or decreased, depending upon the direction of the displacement, by an amount which varies with the displacement while the voltage impressed upon the control electrode-cathode circuit of tube 132 remains fixed. There is thus produced across the secondary winding of transformer 140 a voltage the phase of which changes with the direction of rotation of shaft 124 and the amplitude of which varies with the amount of the displacement from the reference position. The voltage produced across the secondary winding of transformer 140 is impressed upon a push-pull amplifier comprising electronic devices 141 and 142 each having an anode, a cathode, a control grid and a screen grid. The control grids of tubes 141 and 142 are connected respectively to the end terminals of the secondary winding of transformer 140 while the cathodes of the tubes are connected through a varistor 143 to the grounded mid-terminal of the secondary transformer winding. Screen grid voltage is supplied to the tubes from source 130. For supplying anode current to the tubes, the positive terminal of battery 130 is connected to the mid-terminal of the primary winding of a transformer 144, the end terminals of which are respectively connected to the anodes of tubes 141 and 142. The secondary winding of transformer 144 is connected to one of the windings of motor 121, voltage in quadrature with the voltage from transformer 144 being supplied to the second winding of motor 121 from source 137 through a transformer 145. The brush 157 of a potentiometer having a winding 158 is driven through gearing 123 by the motor which drives the output shaft 120. The positive terminal of battery 130 is connected through a resistor 159 to one terminal of winding 158 the other terminal of which is grounded. The brush 157 is connected through a variable condenser 160 and through resistor 135 to the common terminal of resistors 133, 134 and 135.

When the motor 121 drives the output shaft 120 and the brush 157 of potentiometer 158, the voltage measured between the brush 157 and ground is increased or decreased with respect to the voltage across the portion of the circuit comprising condenser 160 and resistor 134. As a result, current flows in one direction or the other through the circuit comprising condenser 160 to produce a voltage drop across resistors 135 and 134 which is added to the voltage in the control grid-cathode circuit of tube 132. The voltage in the circuit which sets up a charging current for condenser 160 is proportional to the displacement of the output shaft 120 so that the charging current or the voltage across resistors 134 and 135 due to the charging current is proportional to the first derivative of the displacement of output shaft 120, an increase of charging current tending to make the control grid of tube 132 more positive. However, since an increase of potential of the grid of tube 132 is opposite in its effect upon the output voltage impressed upon motor 121 to a similar increase in potential of the grid of tube 131, the effective voltage impressed upon the input of the modulator 131, 132, under static conditions of the hand-wheel shaft, is proportional to the difference between the displacement of the hand-wheel shaft 124 and the speed, with a suitable proportionality factor, of output shaft 120. The speed of motor 121 is substantially proportional to the voltage impressed upon it from transformer 144. Because of the amplification of modulator 131, 132 and of amplifier 141, 142, only a very small effective input voltage to the modulator is required for causing a sufficient energization of the motor 121. If, for example, the speed of motor 121 is less than its correct, or normal speed corresponding to a certain displacement of the hand-wheel shaft, the potential impressed upon the grid of tube 132 is also less than normal so that the effective voltage impressed upon the input of the modulator 131, 132 is greater than normal. Thus, the energization of motor 121 is greater than normal and the motor is brought substantially to the correct speed proportional to the hand-wheel shaft displacement. Similarly, if the speed of the motor should be greater than the correct speed corresponding to a certain hand-wheel shaft displacement, the feedback signal impressed upon the grid circuit of tube 132 will cause the motor speed to be reduced to substantially the correct speed such that the speed is substantially proportional to the hand-wheel shaft displacement. The motor speed is relatively more accurately proportional to hand-wheel shaft displacement when the amplification used in the modulator and amplifier is relatively large. The effective input voltage to the modulator undergoes changes, automatically, to compensate for vacuum tube and motor irregularities.

In order to maintain the effective input voltage to the modulator at a very small value, that is, to maintain the potentials at the grids of tubes 131 and 132 nearly balanced, not only must the speed of the output shaft be maintained proportional to the displacement of the hand-wheel shaft, but in addition, when the displacement of the hand-wheel shaft is changed, there must be a change of output shaft displacement proportional to the change of displacement of the hand-wheel shaft. When the hand-wheel shaft displacement is increased to cause an increase of the potential on the grid of tube 131, for example, the output shaft displacement must be increased by a proportionate amount to increase the voltage across the portion of the potentiometer between brush 157 and ground and thereby cause the potential of the grid of tube 132 to be increased due to the increased current flowing through the circuit comprising condenser 160 and resistors 135 and 134. If, for example, the increase of displacement of the output shaft should be less than the correct or normal amount proportional to the increase of displacement of the hand-wheel shaft, the increase of potential of the grid of tube 132 would also be less than the correct value. As a result the energization of motor 121 would be greater than normal for the new hand-wheel position so that the output shaft would be further displaced to cause the potential of the grid of tube 132 to be brought to the correct value. Thereafter, until the position of the hand-wheel shaft is again changed, the motor runs at a new speed corresponding to the new hand-wheel position such that the potential of the grid of tube 132 is maintained at a correct value nearly equal to the potential of the grid of tube 131. The over-all result is that the output shaft undergoes a change of displacement proportional to the change of displacement of the hand-wheel shaft and assumes a new speed proportional to the new displacement of the hand-wheel shaft. Therefore, the output shaft has one component of displacement proportional to the displacement itself of the hand-wheel shaft and a second component of displacement proportional to the time integral of the hand-wheel shaft displacement.

Thus the effective voltage impressed upon the modulator circuit has one component proportional to displacement of the hand-wheel shaft 124 and a second component proportional to the rate of change of displacement of the hand-wheel shaft each of these components being very small with respect to the potential applied to the grid of tube 131 or the potential applied to the grid of tube 132. The ratio of these two components may be changed by adjustment of the resistance of resistor 135 and the capacity of condenser 160, or both, to change the time constant of the condenser charging circuit. Moreover, the ratio of the speed of output shaft 120 to the displacement of the hand-wheel shaft 124 may be changed by adjusting the resistance of resistor 135, the capacity of condenser 160 being also changed to maintain the time constant of the condenser charging circuit fixed, if desired.

When the resistance of resistor 136 is infinite, the ratio of the effective voltage impressed upon the modulator 131, 132 in response to displacement of input shaft 124 to the displacement of shaft 124 is constant. It is desirable in some cases to make this ratio variable, as explained below in connection with Fig. 10, and it is for this reason that resistor 136, the resistance of which may be adjustable to a suitable value, is provided.

Figure 10:
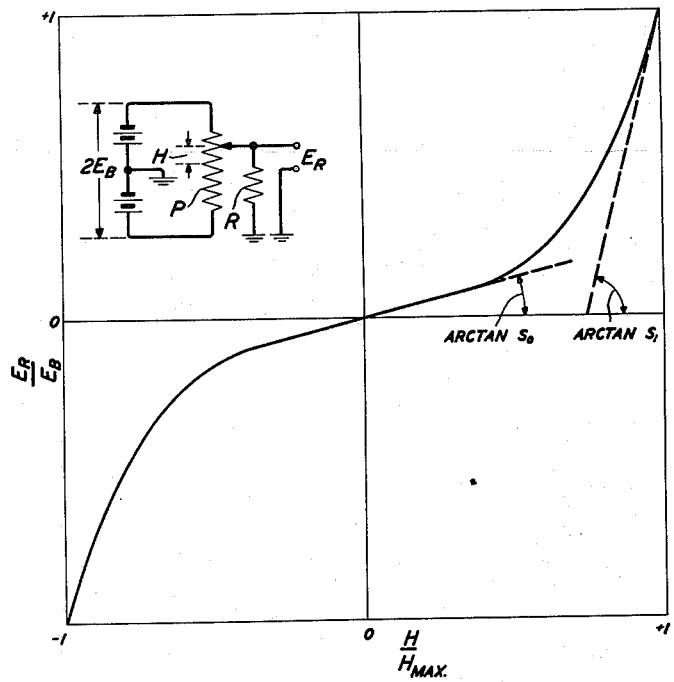

To track a target, the position of which is changing slowly in a coordinate, a low angular velocity of the output or controlled shaft is required and when the operator observes a tracking error he desires to make only small corrections both in the component of output shaft displacement which varies with hand-wheel displacement and in the component which varies with the rate of change of hand-wheel displacement. When the position of the target in the coordinate is changing more rapidly, the corrections which the operator desires to introduce become greater. These two conditions may be illustrated by means of the curve shown in Fig. 10 in which the abscissa is the ratio of hand-wheel displacement H of a potentiometer P, from a reference position giving zero output voltage, to maximum hand-wheel displacement and in which the ordinate is the ratio of output voltage $E_R$ to the maximum output voltage $E_B$. The slope of the curve is determined by the ratio of the resistance of resistor R to the resistance of the winding of potentiometer P. When the ratio $R/P$ is infinite, that is, when resistor R is omitted, the slope of the curve is the same at low as it is at high values of hand-wheel shaft displacement. As the ratio of $R/P$ is decreased, the slope of the curve for low values of hand-wheel displacement ($S_0$) decreases while the slope of the curve for large values of hand-wheel displacement ($S_1$) simultaneously increases. When the arrangement comprising the voltage source 2 $E_B$, potentiometer P and resistor R of Fig. 10 is substituted for the potentiometer 104 and battery 105 of Fig. 6, for example, the rate of change of the voltage component varying with the displacement of hand-wheel shaft 102 and the rate of change of the voltage component varying with the rate of change of displacement of shaft 102, each with respect to hand-wheel shaft displacement, are each larger for large hand-wheel disments than they are for relatively small hand-wheel displacements. The ratio of the two components, however, remains unchanged. If Fig. 8 is modified to include a resistor R having one terminal connected to brush 106 and its other terminal grounded, the rate of change of the voltage component varying with hand-wheel displacement, with respect to hand-wheel displacement, changes, the voltage varying with rate of change of hand-wheel shaft displacement produced by tachometer generator 119 being independent of the position of the hand-wheel shaft. In this case the ratio of the two components of the voltage impressed upon the driving motor 110 changes in response to a change of hand-wheel shaft displacement.

Figure 12:
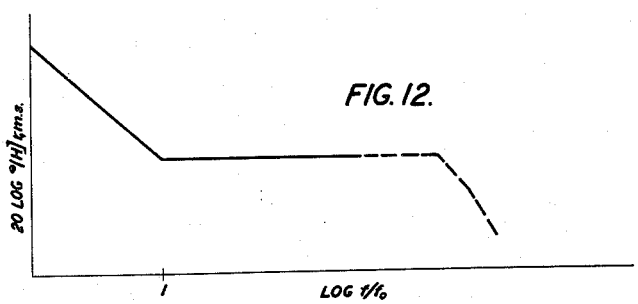
Figs. 11 and 12 are diagrams to which reference will be made in explaining the invention.
Figure 11:
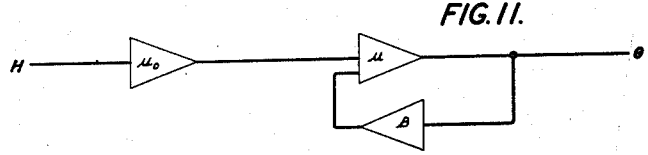

Fig. 11 depicts a generalized tracking arrangement for causing a displacement $\theta$ of an output shaft having a component proportional to the displacement H of an input or controlling shaft and a component proportional to the time integral of the displacement H. Specific embodiments of the tracking system depicted generally in Fig. 11 are shown in preceding figures. The curve of Fig. 12 shows the frequency gain characteristic of a tracking arrangement of the type depicted in Fig. 11. The desired relationship between H and $\theta$ is given by the equation $$\theta = AH + B\int H dt$$

where A and B are constants which may be respectively called the displacement ratio and the rate ratio. In operational notation this equation becomes $$\theta = A\frac{p+\omega_0}{p}H$$

where $p$ is the differential operator and $\omega_0$ is the ratio of the rate ratio B to the displacement ratio A and is the reciprocal of the so-called time constant of the tracking system. It is equal to the frequency in radians per second or equal to $2\pi$ times the frequency $f_0$ in cycles per second at which the slope of the characteristic depicted in Fig. 12 changes from −6 decibels per octave to a slope of zero.

In Fig. 11, $\mu_0$ represents means for converting from a shaft position H to an electric signal followed by an electric network, $\mu$ represents a network followed by a device such as an electric motor for converting from an electric signal to a shaft position $\theta$, and $\beta$ is a feedback element which converts from a shaft position $\theta$ to an electric signal which is impressed upon the input of the network $\mu$. The elements $\mu_0$ and $\beta$ may have a characteristic depending upon frequency. The over-all characteristic of such a system is given by the equation $$\theta = \mu(\mu_0 H + \beta \theta) = \frac{\mu_0 \mu}{1-\mu\beta} H$$

If we ignore the constant A, $$\theta = \frac{p+\omega_0}{p} H = \frac{\mu_0 \mu}{1-\mu\beta} H$$

and the problem of obtaining a tracking system having the desired characteristic depicted in Fig. 12 is one of designing $\mu_0$, $\mu$ and $\beta$ so that $$\frac{\mu_0 \mu}{1-\mu\beta} = \frac{p+\omega_0}{p}$$

To obtain stability it is desirable to make $\mu\beta$ much greater than unity throughout the useful frequency band which in a manually aided tracking system extends from direct current to a frequency usually somewhat less than one cycle per second. Under this condition the above equation reduces to $$-\frac{\mu_0}{\beta} = \frac{p+\omega_0}{p}$$

Three sets of values for $\mu_0$ and $\beta$ such as to satisfy this equation are given below.

I  $\quad \beta = -1; \mu_0 = \frac{p+\omega_0}{p}$

In this case the feedback system becomes an amplifier the response of which is uniform over the useful frequency range and it may, therefore, be omitted if not gain is needed. Such an arrangement is typified by the arrangements shown in Figs. 5 to 8, inclusive.

II  $\quad \mu_0 = 1; \beta = \frac{-p}{p+\omega_0}$

In this case the input element $\mu_0$ has a uniform frequency response characteristic and the feedback element $\beta$ has a characteristic which is the inverse of that desired. A specific embodiment of such an arrangement is shown in Fig. 9.

III  $\quad \mu_0 = p+\omega_0; \beta = -p$

In this case both the input element $\mu_0$ and the feedback element $\beta$ contribute to the desired frequency response characteristic. A specific embodiment of this type of system is shown in Fig. 1 where the characteristic $\mu_0 = p+\omega_0$ is produced by the tachometer generator 73 and the synchro-generator 75 and where the characteristic $\beta = -p$ is produced by the tachometer generator 78.

The automatic range detector 61 will now be described in detail with reference to Figs. 13, 14, 15, 16 and 17 which correspond, respectively, to a portion of Fig. 1 and to Figs. 2, 3, 4 and 5 of application Serial No. 523,721 to B. M. Oliver, filed February 24, 1944.

The output pulses (i) from the circuit 19 are applied to a delay circuit and pulse generator 221 which, for example, produces a pulse 308 (see Fig. 16-G) which has a duration corresponding to a range of, for example, 400 yards, the pulse 308 being initiated after a time interval corresponding to a range of 400 yards from the start of the pulse from the range unit 19. A suitable circuit to perform the functions of the unit 221 is disclosed in Patent No. 2,451,632 granted to B. M. Oliver. The output pulse 308 from the delay circuit and pulse generator 221 (see Fig. 16-G) is also fed to the signal selector 220. A suitable signal selector is also shown in the above-mentioned Oliver application.

Figure 16:
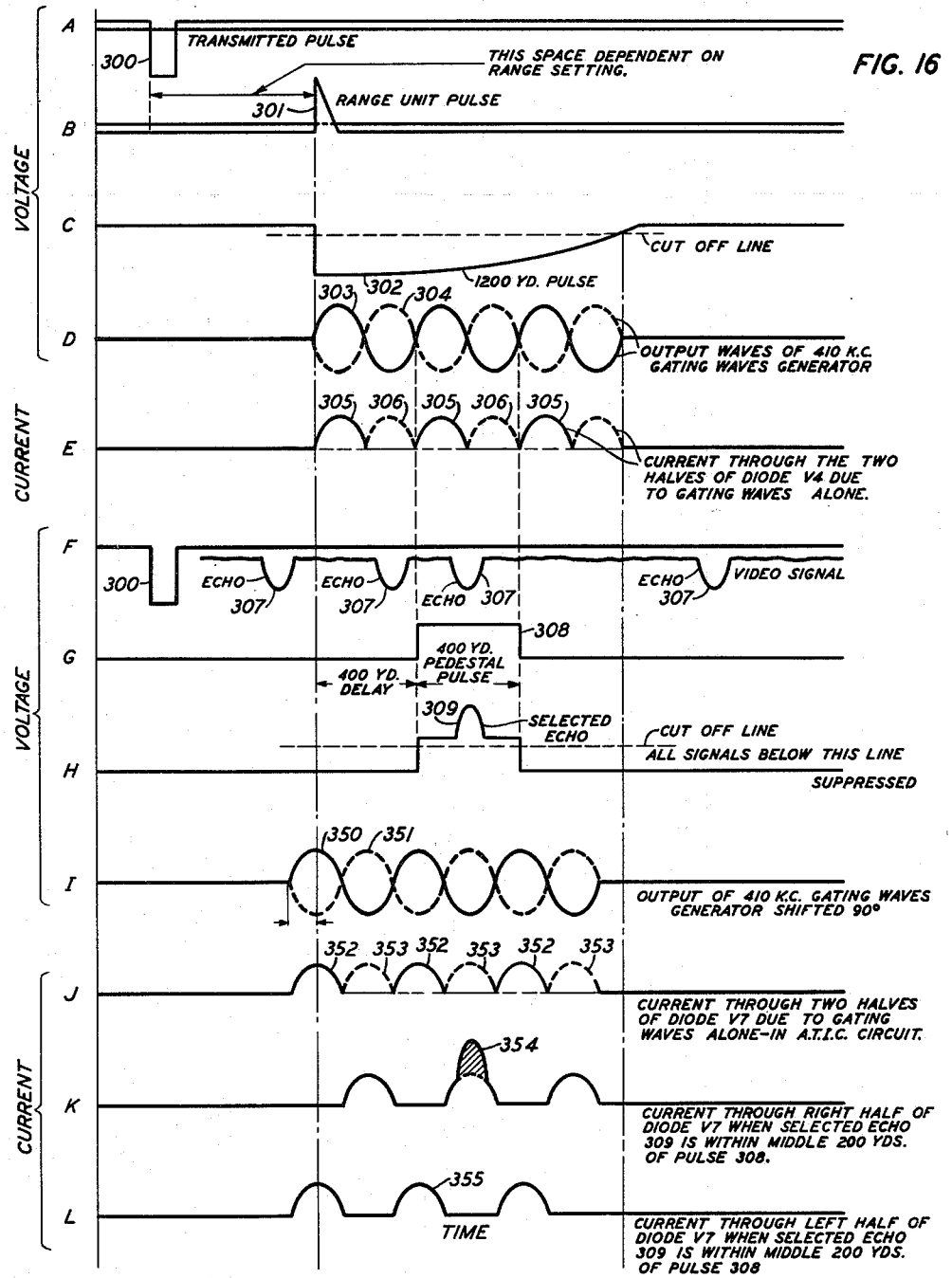

The output pulse 301 from the range unit 19 is also applied to a pulse generator 222 which produces a negative or notch pulse 302 (shown in Fig. 16-C) which is applied to the gating wave generator 223. The pulse 302 has a time duration corresponding to 1200 yards range, for example, and this pulse is started by the range unit pulse 301. Fig. 16-D shows two gating waves 303 and 304 which are produced by the generator 223. The waves 303 and 304 are applied to a range detector 225 to which is also applied the selected portion of the video signal from the signal selector 220. This selected signal is represented by the pulse 309 in Fig. 16-H and is produced by applying a wave such as that shown in Fig. 16-F (representing received and detected pulse 300 corresponding to the transmitted pulse, various echoes 307 and noise voltage components) to the signal selector 220 along with the 400-yard positive or pedestal pulse 308. The pulse 308 causes the signal selector 220 to pass current for the duration of this pulse and reject all portions of the signal produced by the receiver 13 which do not occur within the time span of the 400-yard pulse 308. This is represented in Fig. 16-H, the selected echo signal being shown by the pulse 309. In other words, the signal selector 220 has an output current only during the time span of the pulse 308 and the position of this pulse with respect to the pulse 300 is determined by the position of the range unit pulse 301 with respect to the pulse 300. The range detector 225 which will be more fully described below in connection with Fig. 14 comprises two diodes to the plates of which are applied respectively the gating waves 303 and 304 from the amplifier 224 and to the plates of both of which is applied the selected video signal from the circuit 220. Integrating condensers are connected to the cathodes of the diodes and voltages are produced thereacross which are respectively representative of the total current passed by the diodes during the positive halves of the waves 303 and 304 by means which will be described below. If the pulse 309 is not symmetrically positioned in time with respect to the gating waves 303 and 304 (it has been shown as being symmetrically positioned with respect to the middle positive pulses of the waves 303 and 304) a differential current is produced which is utilized to drive a motor 50 (Fig. 1) to control the range unit 19 in such a way as to vary the position of the range unit pulse 301 shown in Fig. 16-B with respect to the pulse 300 shown in Fig. 16-A. The current used to drive the motor 50 is produced in the modulator 226 to which the signal current from the range detector 225 is applied in addition to 60-cycle waves from the source 235 acting through a phase shifter 229. The output of the modulator 226 which is a 60-cycle wave amplitude modulated by the signals from the circuit 225 is amplified in the amplifier 67 and applied to the motor 50 through an amplifier 60 and a contact and armature of control relay 65 which latter is operated by means of relay 62, as described below.

Figure 14:
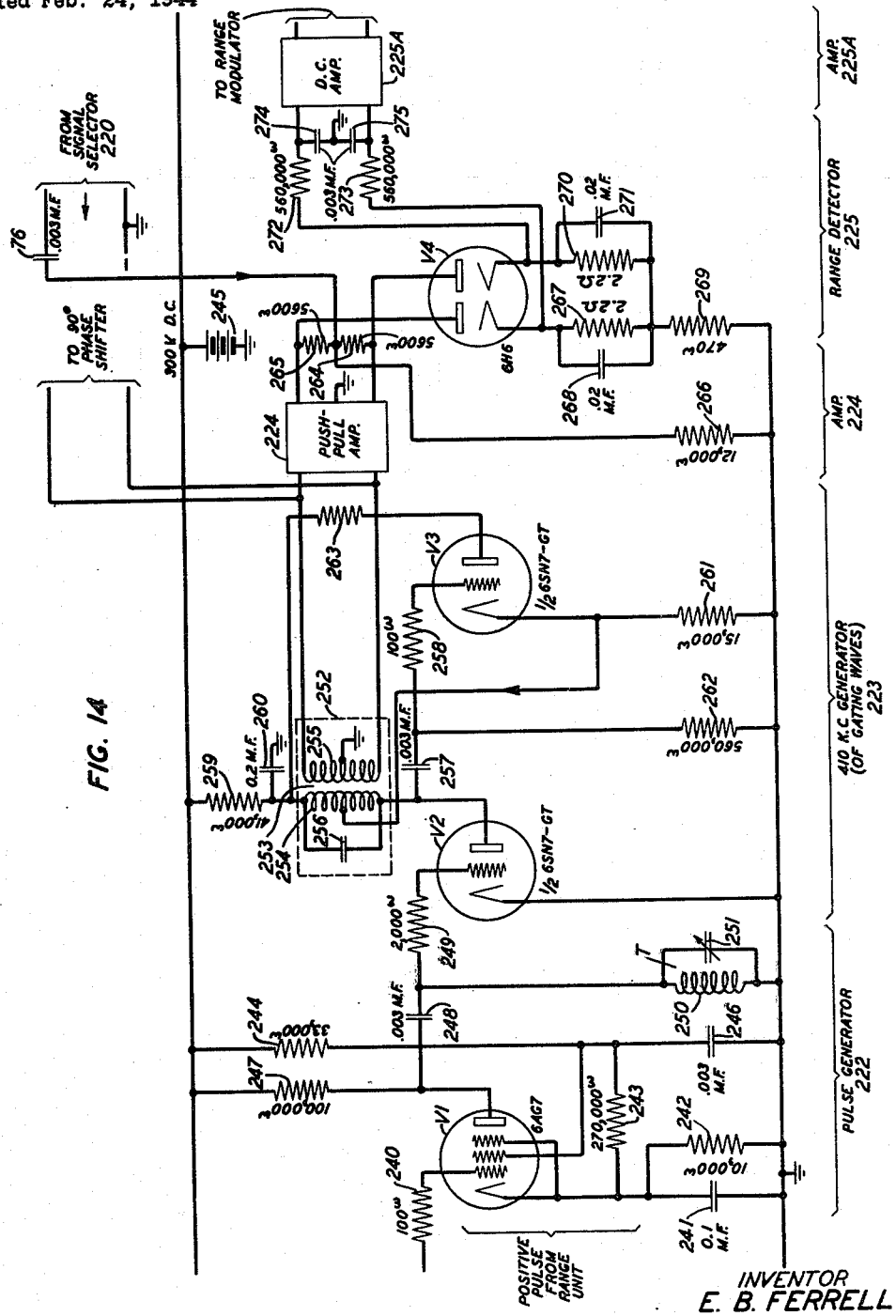
Fig. 14 is a circuit diagram of a portion of the automatic range detector shown in Fig. 13.

Fig. 14 shows the pulse generator 222, the 410-kilocycle generator 223 of the two gating waves, amplifier 224, range detector 225 and direct coupled amplifier 225A. The pulse generator 222 comprises a tube V1 to the control grid of which is applied through a resistor 240 the positive pulses 301 (one for each "transmitted pulse" 300) from the range unit 19. The cathode of this tube is connected to the suppressor grid and also to ground through the parallel connected condenser 241 and resistor 242. The cathode is also connected through resistors 243 and 244 to the positive terminal of a source 245 of constant potential of 300 volts, for example. While the source 245 has been represented schematically as a battery, the negative terminal of which is connected to ground, it is to be understood that any other suitable source can be used. The screen grid of the tube V1 is connected through the resistor 244 to the positive terminal of the source 245 and through a condenser 246 to ground. The plate of the tube V1 is connected through the resistor 247 to the positive terminal of the source 245 and through a condenser 248 and a resistor 249 to the grid of the tube V2 in the generator 223. Connected between the common terminal of the condenser 248 and the resistor 249 and ground is a tuned circuit T comprising a parallel connected inductive member 250 and condenser 251, the latter preferably being adjustable and only a few micromicrofarads. The control grid of the tube V1 is biased below cut-off by placing the cathode at a positive potential by means of the resistors 242, 243 and 244, these resistors acting as a voltage dividing potentiometer. When the range unit pulse 301 is applied to the grid of the tube V1, this tube conducts plate current for the instant that the control grid is above the cut-off voltage. The pulse of plate current drawn by V1 during the time of the range unit pulse 301 charges the condenser 251 through the path comprising this condenser, the condenser 248, the plate cathode resistance of V1, and the condenser 241. This causes the plate voltage to drop about 200 volts and since condenser 248 is much larger than condenser 251, the grid of the tube V2 is driven negative by the same amount. The LC network comprising the members 250 and 251 begins an oscillation which is quenched after one-quarter cycle because the voltage across it begins to swing positive and the grid of tube V2 begins to draw current. The voltage applied to the grid of the tube V2 has the wave form shown in Fig. 16–C. The period of this oscillation can be adjusted by means of the condenser 251 which is adjusted to make the duration of the pulse 302 in Fig. 16–C equal to a period of time equivalent to a 1200-yard range, for example. The large negative grid voltage pulse 302 cuts off the tube V2 for a length of time equal to substantially one-fourth of the period of one oscillation of the network T and produces, by means of apparatus now to be described, plate voltage waves 303 and 304 shown in Fig. 16–D.

Tubes V2 and V3 collectively comprise a generator of the gating waves 303 and 304 which are 180 degrees displaced from each other and are as shown in Fig. 16–D. These waves are sine waves of a frequency of about 410 kilocycles, this frequency being that repired to produce three complete cycles within a period of time corresponding to a range of 1200 yards. Associated with tube V2 is the network 252 comprising a transformer 253 having a primary winding 254 and a secondary winding 255. The primary winding 254 is shunted by a condenser 256 and the mid-point of the winding 254 is connected to the cathode of the tube V3, the mid-point of the winding 255 being connected to ground. The winding 254 has one of its terminals connected to the plate of the tube V2 and through a condenser 257 and resistor 258 to the control grid of the tube V3. The winding 254 has its other terminal connected through the resistor 259 to the positive terminal of the direct current source 245 and through a condenser 260 to ground. The terminals of the secondary winding 255 of the transformer 253 are connected to any suitable push-pull amplifier 224. The cathode of the tube V2 is connected to ground and the cathode of the tube V3 is connected through the resistor 261 to ground. A grid leak resistor 262 is connected in the grid cathode circuit of the tube V3 while the plate of the tube V3 is connected through the resistor 263 to the upper terminal of the winding 254.

The grid of the tube V2 receives the 1200-yard negative pulse 302 from the tube V1. Plate current for the tube V2 normally flows through the transformer winding 254 in the network 252. The voltage pulse 302 applied to the grid of the tube V2 cuts the tube off and the change in plate current of V2 causes the tuned circuit of the network 252 to oscillate. When the grid voltage of the tube V2 rises above cut-off (after a period of time corresponding to a range of 1200 yards), plate current flows again through V2, and the low plate resistance of this tube damps out the oscillations.

The tube V3 is used to supply feedback to the network 252 of just the proper amount to make up for its losses and thereby maintain a constant amplitude for all cycles in the oscillation. The condenser 251 is adjusted until the duration of the large negative grid voltage wave 302 extending below cut-off of the tube V2 is just long enough to produce three complete oscillation cycles of the network 252 before the oscillations are damped out. The wave forms of these oscillatory waves 303 and 304 are shown in Fig. 16–D.

The voltage waves 303 and 304 produced at the respective terminals of the secondary transformer winding 255 are amplified by any suitable push-pull amplifier 224 and applied respectively to the two plates of the double diode tube V4. Equal resistors 264 and 265 are connected in series across the output terminals of the push-pull amplifier 224 and the common terminal of these two resistors is connected through a resistor 266 to ground. The left cathode of the tube V4 is connected through the parallel connected resistor 267 and condenser 268 and the resistor 269 to ground, while the right cathode of the tube V4 is connected through the parallel connected resistor 270 and condenser 271 and the resistor 269 to ground. The two cathodes are also connected through the series resistors 272 and 273 respectively, to the input terminals of the direct coupled amplifier 225A which is of any suitable form. Equal condensers 274 and 275 are connected across the input terminals of the amplifier 225A, the common terminal of the two condensers being connected to ground. The elements 272 and 274 and 273 and 275 serve as two low-pass filters.

The action of the range detector is as follows:
The amplified output waves of the 410-kilocycle generator 223 (such as those shown in Fig. 16-B)

are applied to the two plates of the double diode V4. An adjustment can be made in the push-pull amplifier 224 so that the voltages applied to the two plates of the tube V4 are equal when no video signal from the signal selector 220 is applied to the plates of the tube V4. The signal from the signal selector is applied to the common terminal of the resistors 264 and 265 and this is applied equally to the two plates of the double diode tube V4. A coupling condenser 276 can be used in this input circuit if desired. The period of the selected signal shown in Fig. 16–H is, as pointed out above and as shown in Fig. 16 of the proper length of time to correspond to 400 yards range and this 400-yard pulse coincides with the time of the middle cycle of the two 410-kilocycle sine wave oscillations. Once this adjustment is made, the relation between the 400-yard pulse shown in Fig. 16–G with respect to the waves shown in Fig. 16–D remains fixed even though the time of occurrence of all of these may vary with respect to the time of occurrence of the corresponding transmitted pulse 300, this variation being caused by the changes in time of occurrence of the range unit pulse 301 when the apparatus is being utilized to track the selected target.

If no video signal is applied to the plates of the tube V4 from the signal selector 220, the current through the two halves of the double diode V4 will be equal and will appear as two series of positive half sine waves 305 and 306, Fig. 16–E, as each half of the tube V4 conducts alternately. The pulses are integrated by the condensers 268 and 271. The resulting signal voltages are applied to the two grids of a balanced direct current amplifier arrangement represented schematically by the box 225A in Fig. 14 through the filters 272, 274 and 273, 275 and in turn produce equal voltages.

If there is a video signal exactly in the center of the 400-yard pulse shown in Fig. 16–G, its voltage will add equally to the voltage applied to the two sections of the tube V4 to cause increased currents to flow. The currents through the two halves of the double diode V4 will be increased by the same amount so that the two currents will still be equal. As before, this will result in equal signal voltages at the input of the modulator 226.

If the selected echo signal 309 occurs in the first 200 yards of the 400-yard range pulse, one-half of tube V4, say for example, the right half, will be conducting. The positive voltage of the video signal will add to the voltage on this plate to cause an increase in the flow of current through this diode. The voltage applied to the left plate of the tube V4 will be negative at this instant and the selected signal cannot cause current to flow in this half of the tube. A half cycle later the left plate will be positive and cause current to flow but the video signal will not be present to add to this current so that it will be less than that which flowed in the right half.

If the signal from the target occurs in the second 200 yards of the 400-yard range pulse 108, the current flow through the resistor 267 will be increased while the current flow through the resistor 270 will remain normal. The effect is the reverse of that which takes place under the conditions described in the immediately preceding paragraph. The unequal voltages to ground at these resistors are applied to the input circuits of the balanced direct coupled amplifier 225A and then applied to the modulator 226.

The modulator 226 preferably comprises a bridge structure of four rectifier elements such as that shown in an application of B. M. Oliver, Serial No. 491,829 filed June 22, 1943. An alternating current from a suitable source, such as the source of 60-cycle voltage 235, is applied through a 90-degree phase shifting network 229 to one diagonal of the bridge, the other diagonal being connected to the output terminals of the direct coupled amplifier 225A. The modulator 226 operates in accordance with the description in Patent 2,025,158 issued December 24, 1935 to F. A. Cowan to suppress the carrier from the source 235 and transmit to the output circuit of the modulator substantially only the upper and lower sidebands produced by the amplitude modulation of this carrier by the signal input. The output wave of the modulator is shown in Fig. 8B of the above-mentioned Oliver application, Serial No. 491,829. The output wave from the modulator is amplified by the amplifier 67 which may be of the conventional push-pull type and by a second amplifier 60 of any suitable type. When the control relay 65, in a manner to be described more fully below, is operated, to the "automatic" position, the amplifier 67 is connected through a contact and armature of the control relay 65 to the motor 50. Since the carrier input to the modulator 226 is shifted 90 degrees by the phase shifter 229, the output of the amplifier 60 will bear a plus or minus 90 degrees phase relation to the fixed phase excitation of the motor depending on the direction of the unbalance which drives the modulator 226. Any unbalance voltage resulting from the received signal not occurring symmetrically with respect to the two gating waves (that is, with respect to the pulses 305 and 306 contained within the span of the 400-yard pulse 308) thereby causes rotation of the armature of the motor 50. The rotation is in a direction to vary the timing of the output pulse of the range unit 19 in such a way that the gating waves are centered about the received signal 309, reducing the unbalance of the driving voltage to zero.

It sometimes happens that in the operation of the range tracking unit described above and its associated apparatus, there is a fading in the received signal, so that for periods of time there are no signals from the signal selector. In such a situation there is no differential current to drive the motor 50. Moreover, it might occasionally happen that the selecting 400-yard pulse 308 shown in Fig. 16–G does not span the desired echo signal which condition may exist in initially setting the apparatus for automatic tracking operation or when the apparatus is set into operation again after a period when it has been turned off. In such a situation it is desirable to manually control the operation of the range unit 19 so that the range dial can give an accurate indication of the range to the desired target.

Figure 15:
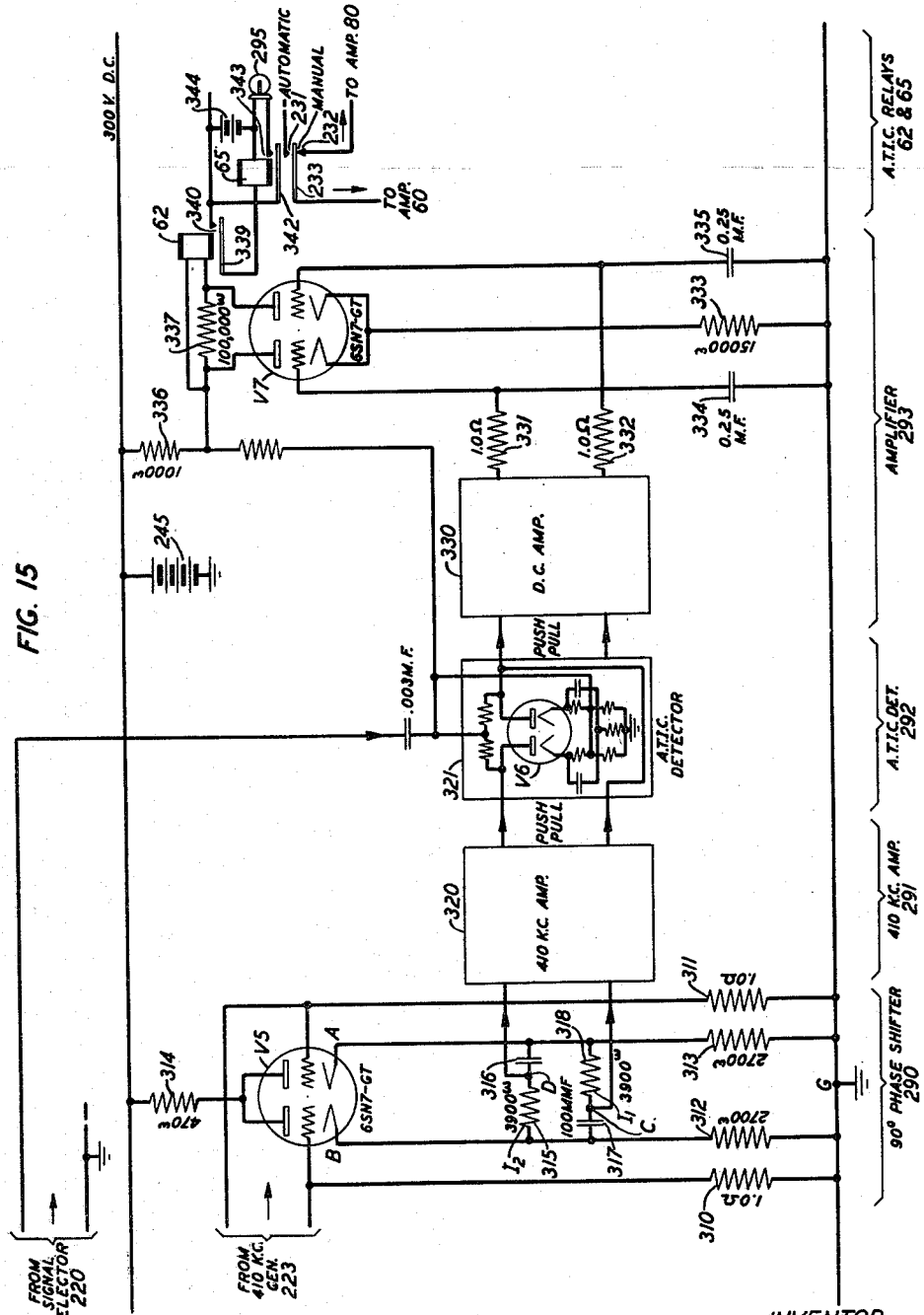
Fig. 15 is a circuit diagram, partly schematic, of another portion of the automatic range detector shown in Fig. 13.

In order to operate the control relay 65 from the manual to the automatic position and vice versa, there are provided a 90-degree phase shifter 290 for shifting the phase of the gating waves from the generator 223 by 90 degrees, an amplifier 291 for these waves, an automatic tracking indicator and control detector 292 (called the A. T. I. C. detector) similar to the double diode tube V4 of Fig. 14, an amplifier 293, an automatic tracking indicator and control relay 62 (called the A. T. I. C. relay) and an automatic tracking indicator 295. Reference will now be made to Fig. 15 for a more detailed description of this apparatus.

Referring now to Fig. 15, gating waves 303 and 304 shown in Fig. 16–D at the terminals of the secondary winding 255 of the transformer 253 are applied to the two control grids of the double triode tube V5 which with its associated circuits acts to shift the phase of these two waves by 90 degrees. The two control grids are connected to ground through resistors 310 and 311, respectively, and the two cathodes are connected to ground through resistors 312 and 313 respectively. The two plates are connected to the positive terminal of the direct current source 235 through resistor 314. Connected in parallel between the two cathodes of the tube V5 are two series connected circuits, one comprising the resistor 315 and the condenser 316 and the other comprising the condenser 317 and the resistor 318. The tube V5 serves as a double cathode follower tube to drive the phase shifter, and the outputs of this phase shifter are taken from the points C and D which are the respective common terminals of the two series connected circuits just described.

The voltages applied to the tube V5 result in alternating voltages from points A and B to ground which are equal and 180 degrees out of phase with each other. Since this is true, the voltage between points A and B will be twice that of the voltage between either of these points to ground. These voltages are shown in the vector diagram of Fig. 17 by vectors AG and GB and the voltage AB is the sum of these two vectors. In this diagram the point A is used as a reference point and, therefore, the arrows for vectors AG and BG are not shown 180 degrees apart as would be the case if point G or ground were used as a point of reference. The currents $I_1$ and $I_2$ flowing between points A and B by way of parallel paths ACB and ADB, will lead the voltage AB by 45 degrees as shown on the vector diagram, since each of these paths has a resistance 315 or 318 in series with a capacitive reactance of the same magnitude at 410 kilocycles (3900 ohms). The voltage drop $E_{R1}$ across resistor 318 will be in phase with the current $I_1$ as represented by vector AC. The voltage drop $E_{C1}$ across condenser 317 lags behind current $I_1$ by 90 degrees and is represented by the vector CB. The voltage drop $E_{C2}$ across the condenser 316 lags behind current $I_2$ by 90 degrees and is represented by the vector AD. The voltage drop $E_{R2}$ across the resistor 315 is in phase with the current $I_2$ and corresponds to vector DB.

The resulting voltage between C and D is 90 degrees ahead of the voltage AB. On the vector diagram of Fig. 17 the voltage from point C to ground adds to that from point O to ground so that vectors CG and DG are represented by arrows pointing upwards. However, if point G had been used as the reference point instead of point A, the vector GD would have been shown with the direction of the arrow reversed since the voltage from point C to ground is 180 degrees out of phase with that from point D to ground. The vector voltages at points C and D are then 90 degrees ahead of the voltage AB at the cathodes of the tube V5 and the voltage to ground at point C is 180 degrees out of phase with the voltage to ground at point D. The voltages from the points C and D are connected to any suitable push-pull amplifier 320.

These voltages are amplified and inverted by the amplifier 320 and applied to the plates of a double diode tube V6 comprising the A. T. I. C. detector 321, this double diode tube being similar to the tube V4 shown in Fig. 14. Like the arrangement including the tube V4 in Fig. 14 a signal from the signal selector 220 is applied to the two plates of the double diode tube V6. The signal from the signal selector 220 applied to the detector 321 is a positive pulse which raises the voltage of both plates of the double diode by an equal amount. Since the the 410-kilocycle gating waves have been shifted 90 degrees in phase by the action of the tube V5 and its associated circuits to become the waves 350 and 351 shown in Fig. 16–I, the right section of the double diode V6, for example, will be conducting during the middle 200 yards of the pulse 308 while the other half of this tube is cut off. Therefore, a video signal occurring within ±100 yards of the center of the 400-yard pulse 308 will cause an additional flow of current in one half of the tube V6 but not in the other half. Fig. 16–J shows the current pulses 352 and 353 through the two halves of V6 due to the gating waves alone, Fig. 16–K shows the current wave 354 through one diode, Fig. 16–L shows the current wave through the other diode when the selected echo 309 is within the middle 200 yards of the 400-yard pulse 308. However, if the signal occurs within 100 yards of either edge of the 400-yard range pulse, an additional flow of current will occur in the other diode that is, the second or third half sine wave in the wave 355 in Fig. 16–L will be larger (depending on whether the selected echo 309 is near the left or right edge of the pulse 308) while the current in the first half of the diode will remain unchanged.

The voltages in the cathode circuits of the tube V6 are integrated by the condensers connected to them and produce positive signal voltages at the grid of the push-pull direct coupled amplifier 330. If no signal is present within the 400-yard range interval spanned by the pulse 308, these voltages are equal and the amplified voltages applied to the tube V7 are equal. Tube V7 comprises a double triode, the control grids of which receive the output signals of the direct coupled amplifier 330 through resistors 331 and 332. The cathodes are connected together and through a resistor 333 to ground. The control grids are connected to ground through condensers 334 and 335 respectively. The left anode is connected to the positive terminal of the source 245 through resistor 336 while the right anode is connected to the positive terminal of this source through resistors 337 and 336. The coil of the A. T. I. C. relay 62 is connected across the resistor 337, the relay also having an armature 339 and a contact 340. Under this condition the plate current of the tube V7 is made insufficient to operate relay 62. If the signal is within plus or minus 100 yards of the center of the pulse 308, one grid of the tube V7, say for example, the left grid, is driven in the negative direction. Since the cathodes of the tube V7 have a common resistor 333, this reduction of the current in the left cathode will reduce the bias and increase the plate current in the right section of the tube V7. If the video signal from the signal selector 220 is of sufficient magnitude, this increase in plate current will cause the relay 62 to operate. A signal occurring within 100 yards of either edge of the pulse 308 shown in Fig. 16–G causes an increase in the current through the left half of the tube V7 and a decrease in the current through the right half. Under this condition the plate current that flows through the relay 338 is insufficient to cause it to operate.

The operation of the relay 62 causes the operation of relays 64 and 65. The operation of the relay 65 causes the armature 342 to make contact with the contact 343 which closes the circuit through the direct current source 344 to cause current to pass through the automatic tracking indicator 295 which may be, for example, a device which gives a visible or an audible indication. The operation of the relay 65 also causes the armature 233 to be moved from a position in contact with the contact element 232 to a position in contact with contact member 231, or in other words to actuate the armature 233 from the "manual" to the "automatic" position.

What is claimed is:

1. A tracking system comprising a controlling shaft and a driven shaft, an induction motor for driving said driven shaft in accordance with the amplitude and phase of a variable voltage impressed thereon, means coupled to said driven shaft for determining the position of an object with respect to a desired coordinate, means under control of said controlling shaft for generating an alternating voltage the amplitude of which is proportional to the displacement of said controlling shaft from a fixed reference position and the phase of which is reversed in response to a change of direction of the displacement from the reference position, means under control of said controlling shaft for generating a second alternating voltage which is proportional to the rate of change of displacement of said controlling shaft, means for generating a third voltage proportional to the speed of said driven shaft, said third voltage being of smaller amplitude than, and reversed in phase with respect to, said first voltage, manually controllable means for changing the ratio of said first and second voltages, a summing amplifier upon the input of which said three voltages are impressed to produce an output voltage proportional to the vector sum of said three voltages, and means for impressing upon said motor to control the displacement of said driven shaft a voltage proportional to said summation voltage.

2. A tracking system comprising a driven shaft, a motor for driving said shaft at a speed determined by the voltage impressed upon said motor, means coupled to said driven shaft for producing an indication of position of an object in a desired coordinate in accordance with the angular displacement of said driven shaft with respect to a fixed reference position thereof, means for detecting errors of said position indication and for producing and impressing upon said motor a first voltage for causing displacement of said controlled shaft to correct said errors, thereby causing said position indicating apparatus to continuously automatically indicate the position of the object during periods when said error detecting means is operative, means for generating under control of a manually rotatable shaft a second voltage for energizing said motor during periods when said error detecting means is ineffective for controlling the energization of said motor, thereby controlling said indicating apparatus to cause it to indicate the position of the object, switching means which becomes automatically operative during periods when said error detecting means becomes ineffective to supply energy to said motor for interrupting the circuit for impressing said first voltage upon said motor and for completing a circuit for supplying said second voltage to said motor, a second motor coupled to said manually rotatable shaft, and means effective during periods when voltage is being supplied to said first motor from said error detecting means for supplying to said second motor a voltage proportional to the difference between said first and second voltages so that the same voltage will be supplied to said first motor immediately before and after the operation of said switching means.

3. In combination, a driven shaft, a first motor coupled to said driven shaft for controlling the displacement thereof in accordance with the energization of said motor, a first source of varying voltage, a first circuit for normally connecting said first voltage source to said motor, a second voltage source, means comprising a control shaft for controlling the voltage of said second source in accordance with the angular displacement of said control shaft from a fixed reference position, a second motor coupled to said control shaft for causing its angular displacement under control of electric energy supplied thereto, means for impressing upon said second motor a voltage proportional to the difference of the voltages of said first and second source, thereby equalizing the voltages of said first and second source, and means which becomes operative in response to a failure of said first voltage source for interrupting the energizing circuit for said second motor, for interrupting the circuit connecting the first voltage source to said first motor and for completing a circuit for connecting said second voltage source to said first motor.

4. In combination, a driven shaft, a first motor coupled to said driven shaft for controlling the displacement thereof in accordance with the energization of said motor, a first source of varying voltage, a first circuit for normally connecting said first voltage source to said motor, a second voltage source, means comprising a control shaft for controlling the voltage of said second source in accordance with the angular displacement of said control shaft from a fixed reference position, a second motor coupled to said control shaft for causing its angular displacement under control of electric energy supplied thereto, means for impressing upon said second motor a voltage under control of said first source, and means which becomes operative in response to a failure of said first voltage source for interrupting the energizing circuit for said second motor, for interrupting the circuit connecting the first voltage source to said first motor and for completing a circuit for connecting said second voltage source to said first motor.

ENOCH B. FERRELL.

REFERENCES CITED

The following references are of record in the file of this patent:

UNITED STATES PATENTS

| Number | Name | Date |
| --- | --- | --- |
| 1,547,574 | Ray | July 28, 1925 |
| 1,554,698 | Alexanderson | Sept. 22, 1925 |
| 1,703,280 | Minorsky | Feb. 26, 1929 |
| 1,973,279 | Bernarde | Sept. 11, 1934 |
| 1,988,458 | Minorsky | Jan. 22, 1935 |
| 2,068,490 | Hull | Jan. 19, 1937 |
| 2,088,654 | Hull | Aug. 3, 1937 |
| 2,134,901 | Wey | Nov. 1, 1938 |
| 2,233,415 | Hull | Mar. 4, 1941 |
| 2,409,970 | Agins | Oct. 22, 1946 |
| 2,424,568 | Isbister et al. | July 29, 1947 |

FOREIGN PATENTS

| Number | Country | Date |
| --- | --- | --- |
| 489,271 | Great Britain | July 22, 1938 |